United States Patent
Scoville et al.

(10) Patent No.: US 10,900,295 B2
(45) Date of Patent: Jan. 26, 2021

(54) FLEXIBLE RISER INSULATION REMOVAL TOOL FOR ULTRASONIC TEST INSPECTION

(71) Applicant: Oceaneering International, Inc., Houston, TX (US)

(72) Inventors: Daniel J. Scoville, The Woodlands, TX (US); Ryan Bradley, Cypress, TX (US); Abhishek Shukla, Sugarland, TX (US)

(73) Assignee: Oceaneering International, Inc., Houston, TX (US)

( * ) Notice: Subject to any disclaimer, the term of this patent is extended or adjusted under 35 U.S.C. 154(b) by 0 days.

(21) Appl. No.: 16/213,731

(22) Filed: Dec. 7, 2018

(65) Prior Publication Data

US 2020/0141190 A1    May 7, 2020

Related U.S. Application Data

(60) Provisional application No. 62/596,808, filed on Dec. 9, 2017.

(51) Int. Cl.

| | | |
|---|---|---|
| *E21B 17/01* | (2006.01) | |
| *E21B 41/00* | (2006.01) | |
| *E21B 29/06* | (2006.01) | |
| *G01V 1/00* | (2006.01) | |
| *G01B 17/02* | (2006.01) | |
| *E21B 29/12* | (2006.01) | |
| *E21B 47/001* | (2012.01) | |

(52) U.S. Cl.
CPC .............. *E21B 17/01* (2013.01); *E21B 29/06* (2013.01); *E21B 29/12* (2013.01); *E21B 41/0007* (2013.01); *E21B 47/001* (2020.05); *G01B 17/02* (2013.01); *G01V 1/001* (2013.01)

(58) Field of Classification Search
CPC ........ G01V 1/001; G01B 17/02; E21B 17/01; E21B 29/06; E21B 29/12; E21B 41/0007; E21B 47/001
See application file for complete search history.

(56) References Cited

U.S. PATENT DOCUMENTS 4,007,705 A * 2/1977 Sherer ................. B05B 13/0436
  118/710

* cited by examiner

*Primary Examiner* — James G Sayre
(74) *Attorney, Agent, or Firm* — Maze IP Law, P.C.

(57) ABSTRACT

A tool can be used remove one or more outer layers of a tubular such as a flexible pipeline to enable an inspection on the remaining layers of the flexible pipeline. It allows the precise removal of outer layers of a flexible riser so that inspection can take place tubulars that otherwise could not be inspected with ultrasound.

20 Claims, 4 Drawing Sheets

FLEXIBLE RISER INSULATION REMOVAL TOOL FOR ULTRASONIC TEST INSPECTION

RELATION TO OTHER APPLICATIONS

This application claims priority through U.S. Provisional Application 62/596,808 filed on Dec. 9, 2017.

BACKGROUND

Pipelines are heavily used in the oil and gas industry for moving petroleum products from one location to another. Since much of the oil and gas industries products are harvested from offshore fields, there are a large number of pipelines installed on the seabed. Other subsea pipelines are stretched between subsea infrastructure and topside production and offloading facilities on the surface.

Pipelines come in two different broad categories, rigid pipelines and flexible pipelines. Flexible pipelines have the benefits over rigid pipelines and are typically constructed of several different layers, each having a specific task which may vary depending on specific specifications require by each client application. Of particular importance to the life of a flexible riser is the area between the pressure sheath and the outer sheath. This area is called the annulus and it includes all the layers contained within this area. If the annulus becomes flooded with seawater, the tensile armor wires will corrode at an accelerated rate as compared to a riser with a non-flooded annuls. Corrosion of the armor wires can result in premature failure of the flexible riser. Annulus flooding can occur do to several different external conditions such as mechanical damage to the riser or leaking end connectors.

Since a flooded annulus can reduce the life of the riser, it is important for the owners of the flexible risers to understand if their risers are flooded or not. On risers that are made without insulation, testing for flooded or non-flooded condition is accomplished using ultrasonic testing which involves projecting sound waves into the into the riser using a ultrasonic probe and looking for the sound waves to penetrate through the layer of the annulus until it hits the armor wires and bounces back to the probe. If the annulus is not flooded the sound will not penetrate the small air spaces that are found between the layers of the flexible riser and, therefore, no sound will be returned from the armor wires. If the annulus is flooded, liquid will be trapped in the small spaced that are in between the riser layers and this liquid will allow the ultrasound to pass through the space between the layers and the armor wires and should be visible on an ultrasound scan.

However, risers made with insulation in them cannot have an ultrasound test performed because the sound waves cannot penetrate the insulation, typically because the insulation is normally made of syntactic foam.

FIGURES

Various figures are included herein which illustrate aspects of embodiments of the disclosed inventions.

DESCRIPTION OF EXEMPLARY EMBODIMENTS

Figure 1:
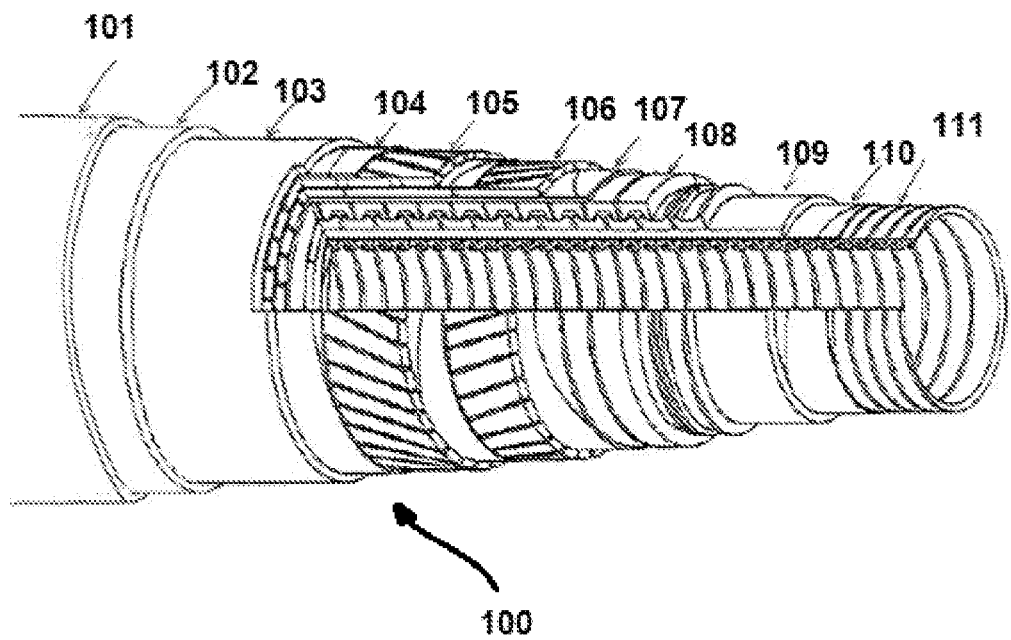
FIG. 1 is a cutaway view in partial perspective of an exemplary flexible riser.

Referring to FIG. 1, a tubular such as a flexible riser typically comprises outer sheath 101, insulation layer 102, inner sheath 103, first tape layer 104, outer tensile armor layer 105, inner tensile armor 106, second tape layer 107, pressure armor 108, pressure sheath 109, third tape layer 110, and carcass 111.

Figure 2:
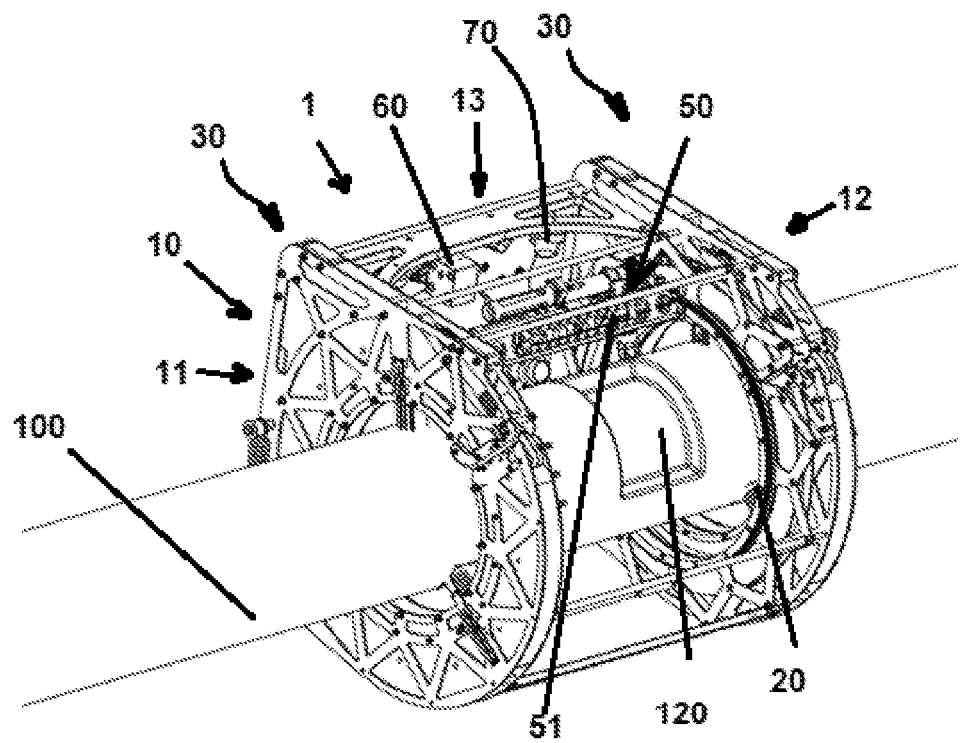
FIG. 2 is a view in partial perspective of an exemplary tool disposed about and engaged against a tubular.
Figure 3:
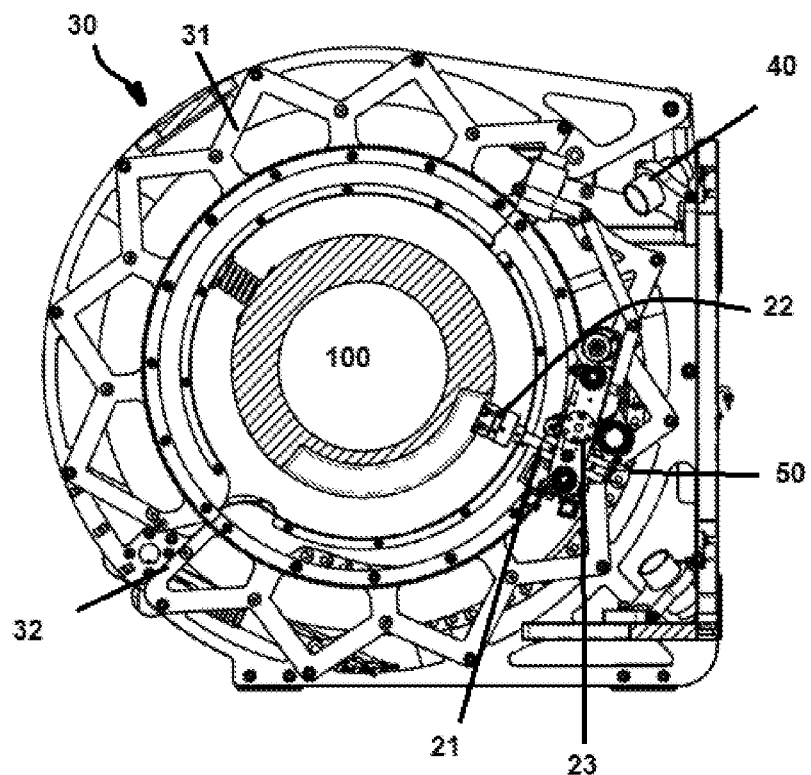
FIG. 3 is a side view in partial perspective of an exemplary tool disposed about and engaged against a tubular.

In a first embodiment, referring generally to FIGS. 1 and 2, tool 1 comprises frame 10 adapted to be secured about outer jacket 101 disposed about an outer portion of a tubular 100, frame 10 comprising first side 11; first clamp 30 disposed proximate first side 11; one or more cutting assemblies 20 movably disposed within frame 10; one or more cutter assembly positioners 50 operatively in communication with cutting assemblies 20, each cutter assembly positioner 50 typically operative to move one of the cutting assemblies 20 along a predetermined axis of cutter assembly positioner 50; one or more control interfaces 60 operatively in communication with clamp arm actuators 40 and cutting assemblies 20; and one or more power interfaces 70 operatively in communication with control interfaces 60, cutting assemblies 20, cutter assembly positioners 50, and first clamp 30. In configurations, tool 1 is adapted to be deployed by a diver or by a subsea device such as a remotely operated vehicle (ROV) or an autonomous vehicle.

First clamp 30 comprises a plurality of clamp arms 31,32, which further comprise and define an arcuate inner surface adapted to removably accept tubular 100 within a void defined by the arcuate inner surfaces, and one or more clamp arm actuators 40 operatively in communication with the plurality of clamp arms 31,32. First clamp 30 may be a mechanically operated clamp, a magnetic clamp, an electromagnetic clamp, or the like, or a combination thereof.

Actuators 40 are typically motors or cylinders that mechanically move clamping arms 31,32 to grasp tubular 100. If used, a motor turns cutter 22 at a rate that is matched to the materials that make up tubular 100. This allows for a smooth cut of the outer layers of tubular 100. The motor can be coupled to cutter 22 by direct drive, belt, chain or gears.

In most embodiments, frame 10 further comprises second side 12 disposed at a distance opposite first side 11 and third side 13 disposed intermediate first side 11 and second side 12. In these embodiments, second clamp 30a, which is typically substantially identical to first clamp 30, is disposed proximate second side 12.

Each cutting assembly typically comprises one or more cutters 22 adapted to cut into outer portion 101 of tubular 100, such as by machining away a portion of outer jacket 101, to a depth that allows ultrasonic testing (UT) to penetrate through one or more non-cut layers of tubular 100, typically at least outer sheath 101 and insulation layer 102, and enable an ultrasonic inspection of tubular 100 and one or more cutter positioners 21 operatively connected to cutters 22 and adapted to advance or retract cutter 22. Typically there is one cutter 22 and one cutter positioner 21. In certain contemplated embodiments, cutter 22 comprises a water jet head to give a smoother bottom of cut surface finish. Use of a water jet head may also provide added safety in cutting inspection window 120 as the water jetting will cut away the insulation material but will not easily cut the inner sheath of tubular 100 because of its elastomeric nature.

One or more cutter assembly positioners 50 typically comprise motor driven lead screw 51. In other embodiments, cutter 22 movements may be carried out and constrained by a rack and pinion type carriage along the length of tubular 100. The movement in the axial direction would be confined to a circumferential gear that keeps cutter 22 perpendicular to an outer diameter of tubular 100. In most embodiments, movements of cutter are typically controlled by an operator turning on hydraulic or electrical motors to move cutter 22 as constrained by the mechanical gears of tool 1.

In certain embodiments, tool 1 further comprises one or more position sensors 23 operatively in communication with a predefined set of cutter assembly positioners 50.

In the operation of exemplary methods, referring back to FIG. 1, cutting into tubular 100 and machining away a predetermined portion of an outer portion of tubular 100, e.g. a subset of layers 101-111, to a depth that allows for ultrasonic testing to penetrate through the remaining layers of tubular 100, by way of example and not limitation to enable an ultrasonic inspection of tubular 100 which may be a riser, using tool 1, as described above, may be effected by positioning tool 1 on and securing tool 1 to tubular 100 at a predetermined position, such as by a diver subsea or a subsea vehicle subsea. This positioning and securing is typically effected by mechanically moving one or more clamping arms 31,32 to grasp tubular 100 and snug tool 1 to tubular 100. Mechanically moving the plurality of clamping arms 31,32 is typically accomplished by energizing a motor or a hydraulic cylinder operatively in communication with the plurality of clamping arms 31,32.

Power interface 70 is operatively connected to a power source and, once disposed proximate the predetermined position, first clamp 30, and second clamp 30a if present, used to secure tool 1 in place about tubular 100 at the predetermined position. In certain embodiments, tool 1 is operatively connected to a topside vessel (not shown in the figures) using an umbilical (not shown in the figures) that provides electrical power and digital communications between the topside vessel and tool 1. In these embodiments, tool 1 is typically positioned by a subsea vehicle subsea (not shown in the figures) and operatively connected to the topside vessel using the umbilical that provides electrical power and digital communications between the topside vessel and tool 1.

After tool 1 is secured, cutter assembly positioner 50 is used to position cutter 22 proximate an area that will be machined on an outer circumference of tubular 100, e.g. near window 120. Cutting assembly 20 is controlled to zero cutting assembly 20 on outer sheath 101 of tubular 100 such as by using control interface 60. Zeroing cutting assembly 20 on the outer sheath of tubular 100 may comprise monitoring the depth in real time using data from position sensor 23. Zeroing cutting assembly 20 is typically performed to allow a precise depth of a cut to be made into the outer sheath of tubular 100. That depth is typically sufficient to allow an ultrasonic signal to penetrate through to an inner sheath of tubular 100 and into a tensile armor wire layer when tubular 100 is flooded.

Figure 4:
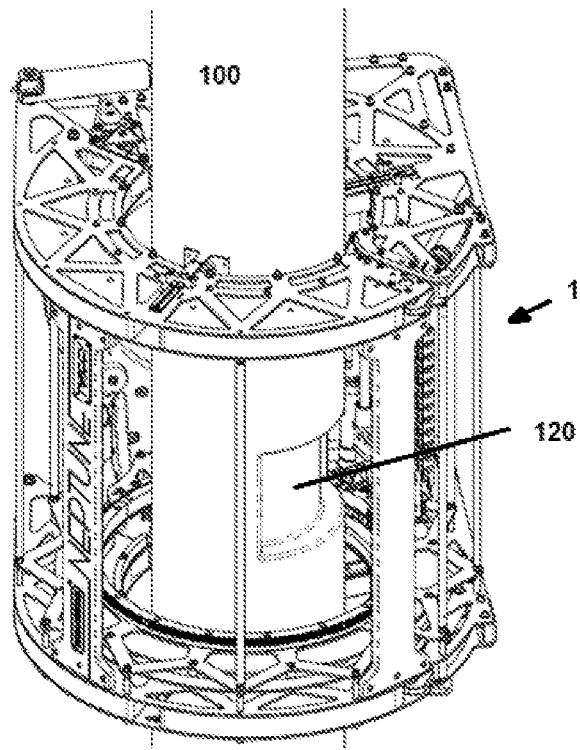
FIG. 4 is a view in partial perspective of an exemplary tool disposed about and engaged against a tubular and illustrating an inspection window.
Figure 5:
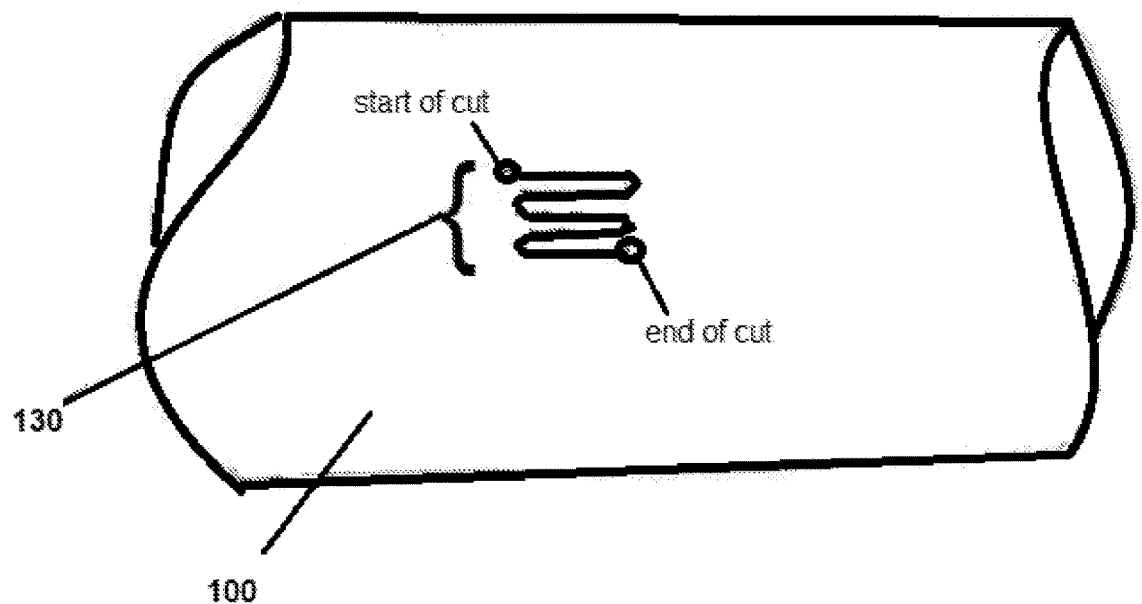
FIG. 5 is a view in partial perspective of an exemplary cutting path.

Once cutting location is known, programmed tool path 130 (FIG. 6) setup on control interface 60 where programmed tool path 130 is adapted to cause cutter assembly positioner 50 to make cutter 22 follow a precise cutting path to make inspection window 120 (FIG. 4) through one or more outer layers 101-111 of tubular 100 and inspection window 120 cut or otherwise machined out of tubular 100 to a depth sufficient to allow an ultrasonic signal to penetrate through to an inner sheath of tubular 100 without causing damage to the inner sheath itself. Typically, a bottom of the cut is sufficiently smooth so the ultrasonic signal is not reflected in an unanticipated direction when making an inspection and therefore not consistently returning to an ultrasonic test probe.

Controlling cutting assembly 20 may be accomplished by an operator sitting on a topside vessel by remotely controlling tool 1 using a software control program. In other embodiments, controlling cutting assembly 20 may be accomplished autonomously using position sensor 23 such as by an autonomous underwater vehicle (AUV) or remotely operated subsea vehicle (ROV).

After cutting inspection window 120, a verification of the size and cut depth can be accomplished using cameras mounted on tool 1. These cameras can be augmented by sonar, laser or photometric systems for making precise subsea measurements of the window depth and size.

After inspection window 120 is cut and the verification is made, tool 1 is typically removed and an inspection tool can be used to perform the flooded/non-flooded annulus test and armor wire thickness tests. In another embodiment, an inspection tool and tool 1 can be combined into a single tool. This can be used shorten the overall inspection time by eliminating the need to swap tools during an offshore inspection operation. Depending on the water depth where the inspection must take place, having a single tool could save considerable time and money for the operator.

In addition, clamp can be put on tubular 100 after the inspection is complete to re-enforce the area where inspection window 120 was cut and protect tubular 100 from any external damages or seawater ingress in this area.

Figure 6:
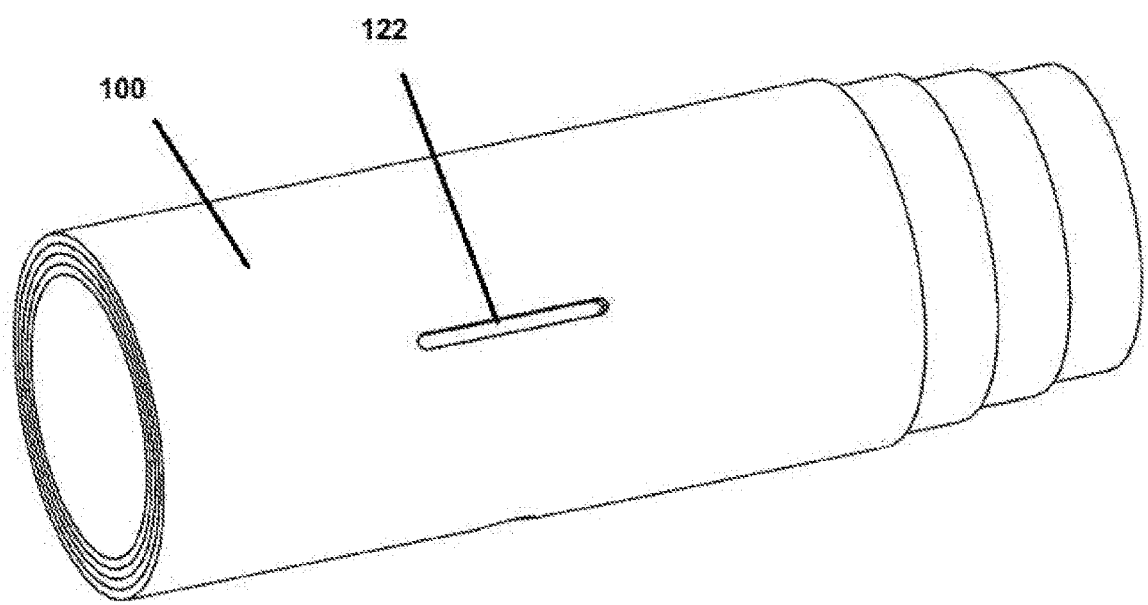
FIG. 6 is a view in partial perspective of an exemplary slot inspection window cut into a tubular.
Figure 7:
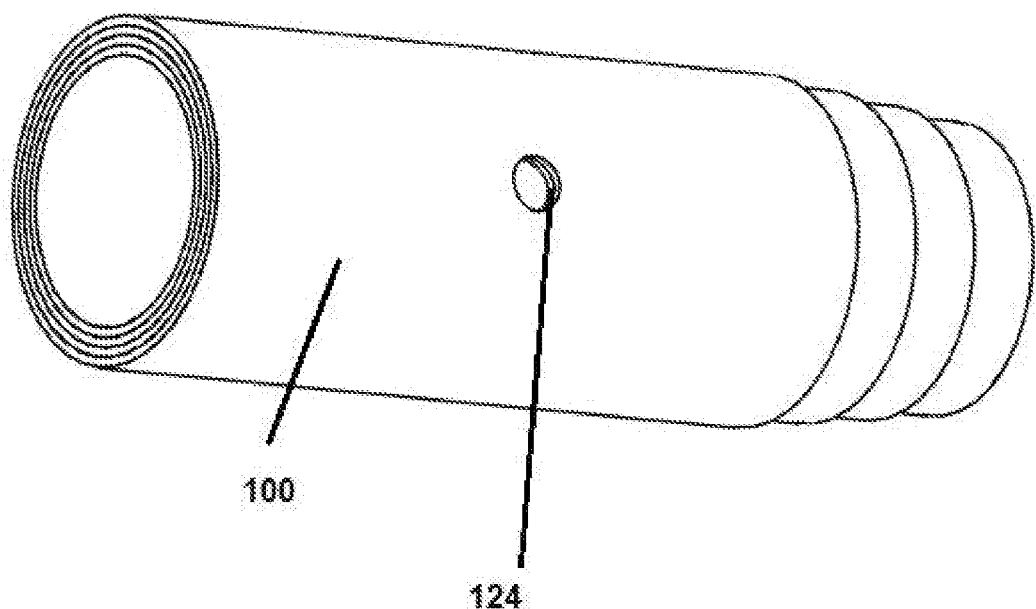
FIG. 7 is a view in partial perspective of an exemplary plunge inspection window cut into a tubular.
Figure 8:
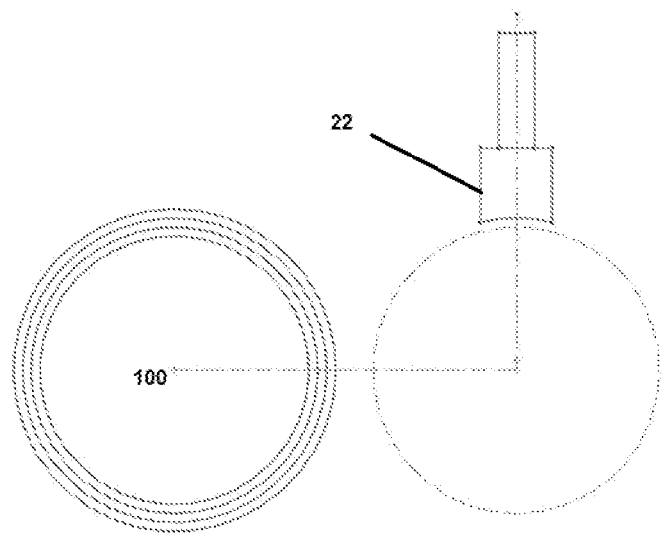
FIG. 8 is a schematic view of a concave cutting bit disposed at least partially in a cutting bit holder.

Referring now to FIGS. 6-8, in some cases, depending on the inspection requirements of a specific application, it will not be necessary to open up a large inspection window 120. In these cases a single pass of cutter 22 maybe all that is needed for a sufficient sized inspection window 120 to detect flooded/non-flooded annulus and inspect for armor wire thickness. FIG. 6 illustrates an example of a slot inspection window 122. In this case the cutting head would be plunged to the appropriate depth in the outer layers of tubular 100 and then a single longitudinal cut can be made by the topside operator to open slot inspection window 122. As with other embodiments, cutter 22 can be controlled with a hydraulic or electrical motor turning a rack and pinion type drive gear, or it can be driven by a linear actuator or hydraulic cylinder thereby simplifying the tool and control system.

In its simplest form the cutting motions could be provided by an underwater vehicle such as an AUV or ROV or divers by moving mechanical handles that move cutter 22 along a constrained tool path. In this case there would be no need for rack and pinion type gears, a drive motor, linear actuators, or hydraulic cylinders to move cutter 22 in an axial or longitudinal direction.

Additionally, referring to FIG. 7, an inspection scenario may only require a single plunge of cutter 22 to open inspection window 120 large enough to check for flooded/non-flooded and annulus testing. In this scenario, an operator may position cutter 22 on tubular 100 in an appropriate position. Positioning of cutter 22 could be as described above or it could be solely only by positioning tool 1 on tubular 100 in the appropriate location. Divers or an underwater vehicle can be used to mechanically move cutter 22 and plunge it into outer layers of tubular 100. In this case, inspection window 120 would be plunge inspection window 124 and cutter 22 would typically comprise a cutting bit such as via a tool holder which can allow the cutting bit to be changed out prior to or during the job to suit the requirements of the inspection. The cutting bit used typically comprises a concave cutting face that is matched to an outer diameter of tubular 100 at the full depth of the cut.

By way of example and not limitation, if the full depth of the cut was to through outer surface 101 to inner sheath 103, the tool bit cutting face would have a concave shape on it with a built in diameter equal to that of the outer diameter of inner sheath 103. This will give the bottom of the cut a radial shape that is beneficial to the inspection technique. FIG. 8 illustrates a cutting bit with an included concave diameter equal to that of inner sheath 103 of tubular 100.

The foregoing disclosure and description of the inventions are illustrative and explanatory. Various changes in the size, shape, and materials, as well as in the details of the illustrative construction and/or an illustrative method may be made without departing from the spirit of the invention.

What is claimed is:

1. A tool, comprising:
   a. a frame adapted to be secured about a plurality of outer layers disposed about an outer portion of a tubular, the outer layers comprising an outer jacket, the frame comprising a first side;
   b. a first clamp disposed proximate the first side, comprising:
      i. a plurality of clamp arms, the plurality of clamp arms comprising and defining an arcuate inner surface adapted to removably accept a tubular within a void defined by the arcuate inner surfaces; and
      ii. a clamp arm actuator operatively in communication with the plurality of clamp arms;
   c. a cutting assembly movably disposed within the frame, the cutting assembly comprising:
      i. a cutter adapted to cut into one or more of the plurality of outer layers of the tubular to a depth at which an ultrasonic inspection of the tubular may occur using an ultrasonic testing (UT) tool which can use ultrasonic waves to penetrate through non-cut layers of the of the plurality of outer layers; and
      ii. a cutter positioner operatively connected to the cutter and adapted to advance the cutter into or retract the cutter from the plurality of outer layers of the tubular;
   d. a cutter assembly positioner operatively in communication with the cutting assembly, the cutter positioner operative to move the cutting assembly along a predetermined axis of the cutter assembly positioner;
   e. a control interface operatively in communication with the clamp arm actuator and cutting assembly; and
   f. a power interface operatively in communication with the control interface, the cutting assembly, the cutter positioner, and the first clamp.

2. The tool of claim 1, wherein the tool is adapted to be deployed by a diver or by a subsea device.

3. The tool of claim 2, wherein the subsea device comprises a remotely operated vehicle or autonomous vehicle.

4. The tool of claim 1 wherein the first clamp comprises a mechanically operated clamp, a magnetic clamp, or an electromagnetic clamp.

5. The tool of claim 1 wherein the cutter is further adapted to either machine away a portion of the outer jacket or remove the portion of the outer jacket by fluid pressure.

6. The tool of claim 1 wherein the frame further comprises:
   a. a second side disposed at a distance opposite the first side;
   b. a third side disposed intermediate the first side and the second side; and
   c. a second clamp, substantially identical to the first clamp and disposed proximate the second side.

7. The tool of claim 1 wherein the cutter assembly positioner comprises a motor driven lead screw or a rack and pinion type carriage disposed along a length of the tubular.

8. The tool of claim 1 further comprising a position sensor operatively in communication with the cutter positioner.

9. A method of cutting into a tubular, the tubular comprising a plurality of outer layers, the plurality of layers comprising an outer jacket, and machining away a predetermined portion of an outer portion of the tubular to a depth that allows ultrasonic testing to penetrate through the remaining layers of the plurality of outer layers of the tubular and enable an ultrasonic inspection of the riser using a tool comprising a frame adapted to be secured about the outer jacket disposed about an outer portion of a tubular, the frame comprising a first side; a first clamp disposed proximate the first side, comprising a plurality of clamp arms, the plurality of clamp arms comprising and defining an arcuate inner surface adapted to removably accept a tubular within a void defined by the arcuate inner surfaces and a clamp arm actuator operatively in communication with the plurality of clamp arms; a cutting assembly movably disposed within the frame, the cutting assembly comprising a cutter adapted to cut into one or more of the plurality of outer layers of the tubular to a depth at which an ultrasonic inspection of the tubular may occur using an ultrasonic testing (UT) tool which can use ultrasonic waves to penetrate through non-cut layers of the of the plurality of outer layers and a cutter positioner operatively connected to the cutter and adapted to advance the cutter into or retract the cutter from the plurality of outer layers; a cutter assembly positioner operatively in communication with the cutting assembly, the cutter positioner operative to move the cutting assembly along a predetermined axis of the cutter assembly positioner; a control interface operatively in communication with the clamp arm actuator and cutting assembly; and a power interface operatively in communication with the control interface, the cutting assembly, the cutter positioner, and the first clamp, the method comprising:
   a. positioning the tool on the tubular at a predetermined position;
   b. operatively connecting the power interface to a power source;
   c. once disposed proximate the predetermined position, using the first clamp to secure the tool in place about the tubular at the predetermined position;
   d. after the tool is securely put in place, moving the cutter head by use of the cutter positioner to the area that will be machined on an outer circumference of the tubular;
   e. controlling the cutting assembly to zero the cutting assembly on an outer sheath of the tubular;
   f. once the cutting location is known, setting up a programmed tool path on the controller, the programmed tool path adapted to cause the cutter assembly positioner to make the cutting assembly follow a precise cutting path to make an inspection window in the outer layer of the tubular; and g. cutting the inspection window out of the tubular to a depth sufficient to allow an ultrasonic signal to penetrate through to an inner layer of the plurality of layers of the tubular, the inner layer of the plurality of layers comprising an inner sheath, without causing damage to the inner sheath itself, a bottom of the cut being sufficiently smooth so the ultrasonic signal is not reflected in an unanticipated direction when making an inspection and therefore not consistently returning to an ultrasonic test probe.

10. The method of claim 9, wherein the tool is positioned by a diver subsea.

11. The method of claim 9, wherein the tool is positioned by a subsea vehicle subsea.

12. The method of claim 9, wherein the tool is operatively connected to a topside vessel using an umbilical that provides electrical power and digital communications between the topside vessel and the tool.

13. The method of claim 12, wherein the tool is positioned by a subsea vehicle sub sea.

14. The method of claim 12, wherein controlling the cutting assembly is accomplished by an operator present on the topside vessel by remotely controlling the tool using a software control program.

15. The method of claim 9 wherein zeroing the cutting assembly on the outer sheath of the tubular further comprises monitoring the depth in real time using data from the position sensor.

16. The method of claim 9, wherein controlling the cutting assembly is accomplished autonomously using the position sensor by an autonomous underwater vehicle (AUV) or remotely operated subsea vehicle (ROV).

17. The method of claim 9, wherein zeroing the cutting assembly on the outer sheath of the tubular is performed to allow a precise depth of a cut to be made into the outer sheath of the tubular.

18. The method of claim 17, wherein the precise depth is further sufficient to allow the ultrasonic signal to penetrate through to the inner sheath of the tubular and into a tensile armor wire layer when the tubular is flooded.

19. The method of claim 9, wherein the tool is placed about the tubular at the predetermined position by mechanically moving the plurality of clamping arms to grasp the tubular.

20. The method of claim 19, wherein mechanically moving the plurality of clamping arms is accomplished by energizing a motor or a hydraulic cylinder operatively in communication with the plurality of clamping arms.

\* \* \* \* \*